US009516526B1

(12) United States Patent
Broyles et al.

(10) Patent No.: US 9,516,526 B1
(45) Date of Patent: Dec. 6, 2016

(54) VISUALIZING AND ANALYZING SPECTRUM ASSETS

(71) Applicant: Sprint Communications Company L.P., Overland Park, KS (US)

(72) Inventors: Daniel Stewart Broyles, Olathe, KS (US); Douglas L. Machamer, Overland Park, KS (US); Anthony A. Panella, Littleton, CO (US); Nichole D. Rowland, Kansas City, MO (US); Michael Iverson, Peculiar, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/196,724

(22) Filed: Mar. 4, 2014

Related U.S. Application Data (63) Continuation of application No. 13/654,880, filed on Oct. 18, 2012, now Pat. No. 8,719,147, which is a
(Continued)

(51) Int. Cl.
  *H04W 24/00* (2009.01)
  *H04W 24/08* (2009.01)
  (Continued)

(52) U.S. Cl.
  CPC ............. *H04W 24/08* (2013.01); *G06Q 30/06* (2013.01); *H04L 29/06* (2013.01); *H04B 7/04* (2013.01)

(58) Field of Classification Search
  None
  See application file for complete search history.

(56) References Cited

U.S. PATENT DOCUMENTS 6,252,634 B1 * 6/2001 Yuen ................. H04N 5/50
  348/478
6,317,081 B1 * 11/2001 Stilp ................. G01S 5/02
  342/174
(Continued)

OTHER PUBLICATIONS

Seo, D.. Organizational strategies for information and communications technology standards. Ph.D. dissertation, University of Illinois at Chicago, United States—Illinois.*
(Continued)

*Primary Examiner* — Gurkanwaljit Singh (57) ABSTRACT

A method and system are provided for visualizing and analyzing spectrum assets. License, channel, and lease data from a communications authority is collected and formatted into individual polygon maps. The maps could be drawn according to county or state boundaries, or by some other mapping standard. The maps are then divided and redrawn into several market service areas and several basic trading areas. The maps are also divided and redrawn according to the bandwidth spectrum of one or more channels. Since the maps are drawn with several different boundary conditions, the layout of all of the maps result in some maps being partially overlaid onto other maps for the same region. These regions containing partially overlaid maps are redefined as superblocks. Each superblock contains all of the data from each overlaid map portion for that particular region. These superblocks provide a means of displaying or representing a completely mapped region, such as the continental United States in a completely non-overlapping manner. Several methods analyze the newly formed non-overlapping data map for purposes of deriving current assets and forming future marketing strategies.

18 Claims, 6 Drawing Sheets

Related U.S. Application Data continuation of application No. 12/256,313, filed on Oct. 22, 2008, now Pat. No. 8,332,264.

(51) Int. Cl.
*G06Q 30/06* (2012.01)
*H04L 29/06* (2006.01)
*H04B 7/04* (2006.01)

(56) References Cited

U.S. PATENT DOCUMENTS

| | | | | |
|---|---|---|---|---|
| 6,871,137 | B2* | 3/2005 | Scaer | G08G 1/202 700/216 |
| 6,954,470 | B2* | 10/2005 | Paneth | H04W 52/20 370/330 |
| 7,127,272 | B1* | 10/2006 | Almaleh | H01Q 1/00 342/423 |
| 7,171,477 | B2* | 1/2007 | Hori | H04L 63/0428 455/453 |
| 7,302,323 | B2* | 11/2007 | Anderson | G07C 5/0858 244/158.1 |
| 7,958,041 | B2* | 6/2011 | Stanforth | G06Q 10/063 705/35 |
| 2002/0039904 | A1* | 4/2002 | Anderson | G01S 5/02 455/456.1 |
| 2002/0091699 | A1* | 7/2002 | Norton | G06Q 10/087 |
| 2003/0067895 | A1* | 4/2003 | Paneth | H04W 52/20 370/330 |
| 2003/0105835 | A1* | 6/2003 | Hori | H04L 63/0428 709/219 |
| 2004/0243299 | A1* | 12/2004 | Scaer | G08G 1/202 701/522 |
| 2005/0002473 | A1* | 1/2005 | Kloper | G01R 23/16 375/316 |
| 2005/0046584 | A1* | 3/2005 | Breed | B60C 11/24 340/13.31 |
| 2006/0031082 | A1* | 2/2006 | Amaitis | G06Q 50/188 705/80 |
| 2006/0143111 | A1* | 6/2006 | Mylet | G06Q 30/06 705/37 |
| 2008/0175210 | A1* | 7/2008 | Jamieson | H04W 24/10 370/338 |
| 2008/0221951 | A1* | 9/2008 | Stanforth | G06Q 10/063 705/7.41 |
| 2008/0222019 | A1* | 9/2008 | Stanforth | G06Q 10/063 705/37 |
| 2008/0222021 | A1* | 9/2008 | Stanforth | G06Q 10/063 705/37 |
| 2009/0296640 | A1* | 12/2009 | Gilbert | H04W 72/085 370/329 |

OTHER PUBLICATIONS

Yuan, Y.. Enabling dynamic spectrum allocation in cognitive radio networks. Ph.D. dissertation, University of Maryland, College Park, United States—Maryland.*

Wendorf, Roli Garg (2005). Channel-change games in spectrum-agile wireless networks. D.P.S. dissertation, Pace University, United States—New York.*

Ryan, Patrick (2004). The effect of emerging wireless technologies on the law and regulation of spectrum allocations in the United States and the European Union. Ph.D. dissertation, Katholieke Universiteit Leuven (Belgium), Belgium.*

Wendorf, Roli Garg (2005). "Channel-change games in spectrum-agile wireless networks". D.P.S. dissertation, Pace University, United States—New York.

Dongback Seo, "Organizational Strategies for Information and Communications Technology", University of Illinois at Chicago, United States—Illinois.

"Yuan Yuan", "Enabling Dynamic Spectrum Allocation in Cognitive Radio Networks", University of Maryland, College Park, United States—Maryland.

Notice of Allowance, mailed Aug. 1, 2012 in U.S. Appl. No. 12/256,313.

Advisory Action mailed Jan. 25, 2012 in U.S. Appl. No. 12/256,313.

Final OA mailed Oct. 27, 2011 in U.S. Appl. No. 12/256,313.

Non Final OA mailed Jun. 22, 2011 in U.S. Appl. No. 12/256,313.

Notice of Allowance mailed Dec. 19, 2013 in U.S. Appl. No. 13/654,880.

Non Final OA mailed Jun. 17, 2013 in U.S. Appl. No. 13/654,880.

* cited by examiner

VISUALIZING AND ANALYZING SPECTRUM ASSETS

RELATED APPLICATIONS

This application is a continuation of U.S. application Ser. No. 13/654,880, filed Oct. 18, 2012, which is a continuation of U.S. application Ser. No. 12/256,313, and filed on Oct. 22, 2008, which are each incorporated herein by reference in the entirety.

BACKGROUND

A vast amount of data is available from a communications authority, such as the Federal Communications Commission. The available communications data includes, but is not limited to, information on licensing, channels, and leases for a particular mapped area. A very large extensive map is necessary to describe the complete realm of communications data for the continental United States. Several spreadsheet collection processes are also required. Labor intensive mathematical operations are necessary to identify all of the spectrum within a large region. Determining the populations that are associated with individual regions of spectrum, and determining the ownership of each individual region also requires very laborious mathematical operations. The desired information is manually collected, documented, and compiled.

SUMMARY

Embodiments of the invention are defined by the claims below. A high-level overview of various embodiments of the invention is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

In a first embodiment, available spectrum communications data includes, but is not limited to data on licensing, channels, and leases for a particular mapped area. In addition to data from a communications authority, marketing data used to define market service areas and basic trading areas are identified as spectrum assets. The spectrum assets can be visualized, then analyzed by breaking up a larger map, such as the United States into smaller defined areas.

All desirable data from a communications authority, such as spectrum license, channel, and lease data is collected. This data is mapped into individual polygon maps for each specific license, channel, and lease for a particular geographical region of interest. When these polygon maps are laid out across the particular geographical region of interest, many of these individually mapped polygons will overlap. A boundary or border is drawn around the area in which multiple mapped polygons overlap This forms a new mapped polygon, which can be called a superblock. This new mapped superblock consists of multiple overlapped areas, where each overlapped area contains its own specific data. Each superblock contains all of the cumulative data from each overlapping area within that superblock boundary.

The formation of superblocks in lieu of overlapping polygons allows the entire mapped area of interest to be viewed and analyzed as a two-dimensional region containing two-dimensional data. The entire spectrum data for all polygons (non-overlapping regions) and superblocks (previously overlapping regions) can now be processed.

Several methods are described, which are designed to process and analyze the collected data. A superblock method takes raw data and polygon maps, such as channel data maps, and determines where any of the polygon maps overlap. A boundary, called a superblock is established around each geographical region that contains overlapping mapped areas. The data from all of the overlapping mapped areas for each superblock is combined or cumulated to form a total data summation for that superblock.

A covers method is used at the superblock level to determine if a particular entity has control over certain specified channels of a superblock. The covers method is also used inside of three other methods. One of these other methods determines the total spectrum depth or bandwidth for a particular superblock. A second method determines the maximum contiguous or continuous spectrum depth for channels within a particular bandwidth. A third method determines the bandwidth depth, along with a population factor for selected channels of interest.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Embodiments of the invention provide systems and methods for analyzing and visualizing spectrum assets. This detailed description satisfies the applicable statutory requirements. Although the terms "step," "block," "module," etc. might be used herein to connote different components of methods or systems employed, the terms should not be interpreted as implying any particular order among or between various steps herein disclosed unless and except when the order of individual steps is explicitly described.

Throughout the description of different embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of any embodiment of the invention.

As one skilled in the art will appreciate, embodiments of the present invention may be embodied as, among other things: a method, system, graphical user interface (GUI), or computer-program product that is embodied on one or more tangible computer-readable media. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media. Computer-readable media include both volatile and nonvolatile media as well as removable and nonremovable media.

By way of example, and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory components can store data momentarily, temporarily, or permanently. The computer readable media include cooperating or interconnected computer readable media, which exist exclusively on a processing system or distributed among multiple interconnected processing systems that may be local to or remote from the processing system.

Figure 6:
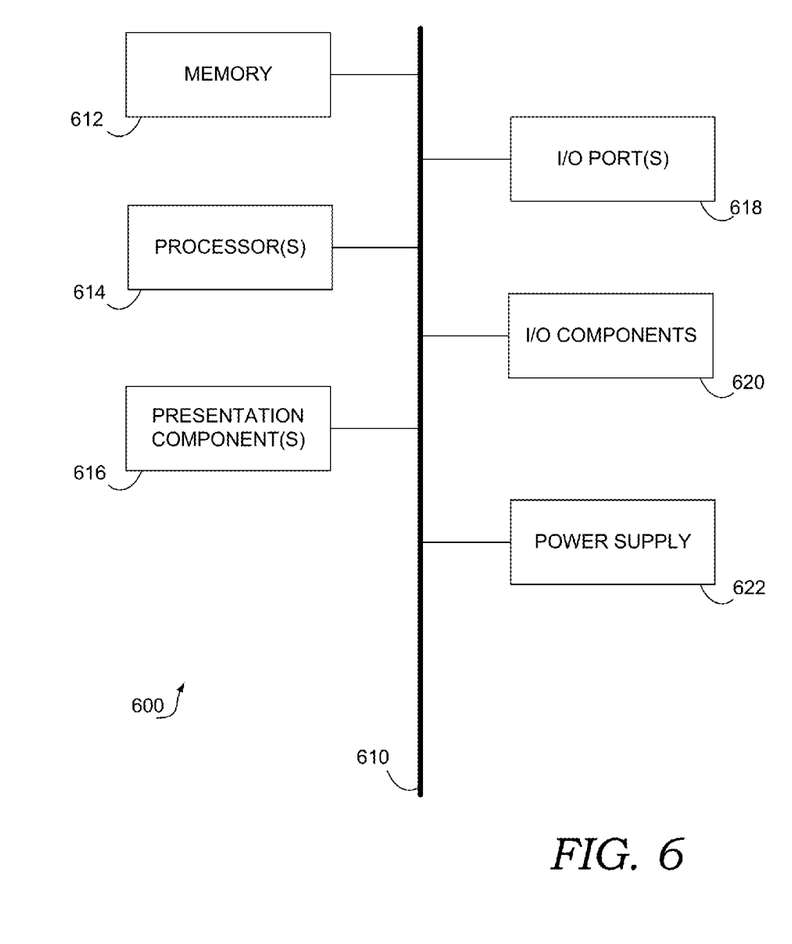
FIG. 6 depicts a general computing system used in accordance with one or more embodiments of the invention.

Having briefly described a general overview of the embodiments described herein, an exemplary computing device is described below. Referring initially to FIG. 6 in particular, an exemplary operating environment for implementing the embodiments of the invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. In one embodiment, computing device 600 is a conventional computer (e.g., a personal computer or laptop).

One embodiment of the invention may be described in the general context of computer code or machine-useable instructions, including computer-executable instructions such as program modules, being executed by a computer or other machine. Generally, program modules including routines, programs, objects, components, data structures, and the like refer to code that perform particular tasks or implement particular abstract data types. Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. By way of example, and not limitation, computer-readable media may comprise RAM; ROM; EEPROM; flash memory or other memory technologies; CDROM, DVD or other optical or holographic media; magnetic cassettes, magnetic tape, magnetic disk storage or other magnetic storage devices, or similar tangible media that are configurable to store data and/or instructions relevant to the embodiments described herein.

Memory 612 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

The components described above in relation to computing device 600 may also be included in a mobile device. A mobile device, as described herein, refers to any type of mobile phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. Embodiments described herein mention to both a computing device and a mobile device. In embodiments, computing devices merely refer to devices that are running applications of which images are captured by the camera in a mobile device.

The computing system described above is configured to perform spectrum analysis, which is described below. A communications authority, such as the Federal Communications Commission, licenses spectrum to different entities to use for educational or commercial purposes. Each licensed spectrum has a license identifier, which is sometimes referred to as a call sign. Each spectrum position identified by a call sign can have one or more channels. Each channel is a frequency band whose range is usually measured in mega Hertz (MHz).

Each channel can have its own geographical boundary. The same frequency channel can be assigned to another call sign some distance away; the boundaries are drawn such that they do not overlap each other. Therefore, channel A1 from one call sign may not overlap with channel A1 from another call sign. However, different channels can overlap each other. As an example, which is not to be construed as limited to such, channel A1 can overlap channel A2 within a single call sign. Multiple channels from a common call sign may have identical boundaries.

Each call sign and channel can have different geographical boundaries and communications authorization. Each channel is usually designated with a particular bandwidth, a center frequency, a call sign (licensing identifier), a controlling entity, and a control type, such as full flexible use or controlled. Each license can be leased and can have different controlling entities and lease control terms. The amount and type of desirable data available from a communications authority could be very large and cover a broad range of subject areas. As a result, mapping all of this data can be very cumbersome and time consuming. In addition to communications authority data, it would also be desirable to include marketing information in the form of maps.

The available spectrum communications data includes, but is not limited to, data on licensing, channels, and leases for a particular mapped area. In addition to data from a communications authority, embodiments of the invention also incorporate marketing data by defining market service areas and basic trading areas. In one embodiment, spectrum assets can be visualized and analyzed by breaking up a larger map, such as the United States, into smaller defined areas.

Figure 1:
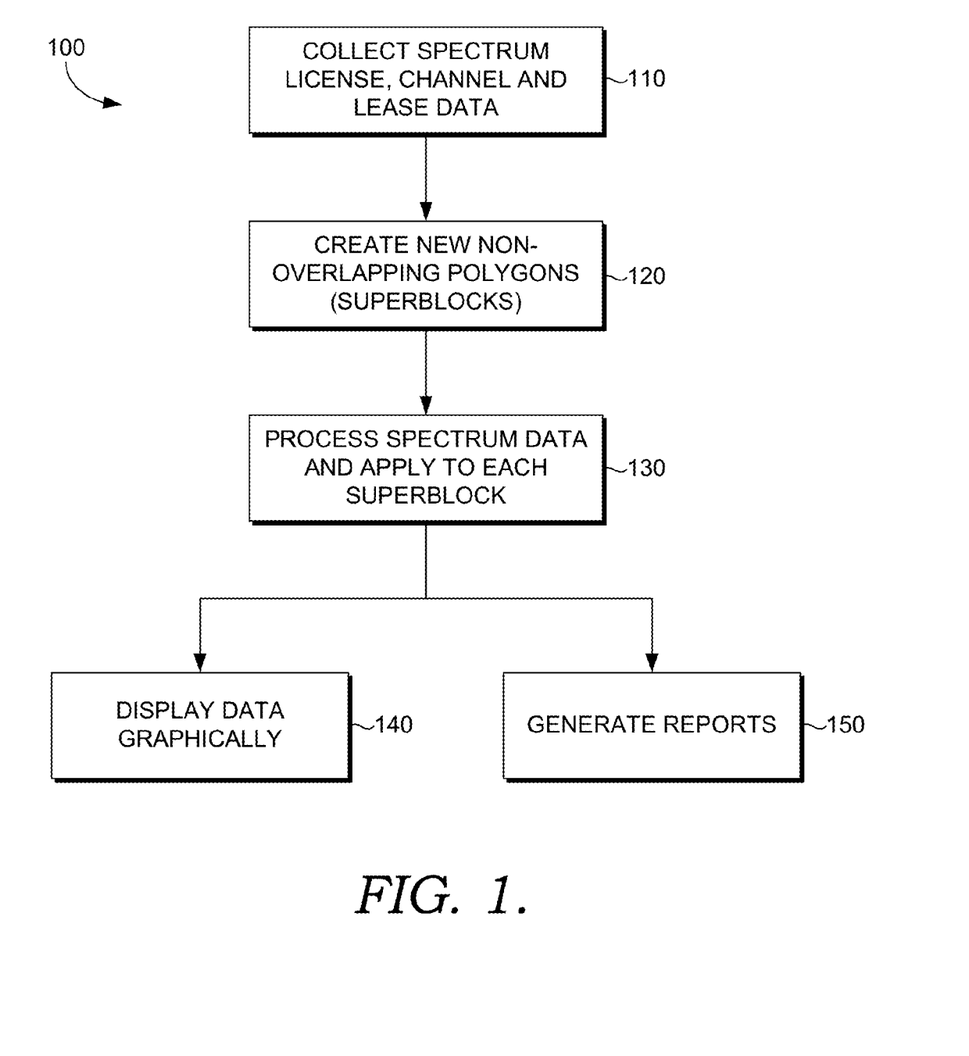
FIG. 1 is a flow diagram that depicts the basic procedure in accordance with an embodiment of the invention.

FIG. 1 is a flow diagram that describes the basic procedure that is referred to as spectrum asset analysis 100. As described above, all desirable data from a communications authority, such as spectrum license, channel, and lease data is collected in step 110. This data is mapped into individual polygons for each specific license, channel, and lease for the particular geographical region that it covers. Since the amount of data collected will probably be large, it is very likely that many of these individually mapped polygons will overlap. New polygons are then formed for each overlapped region; a boundary or border is drawn around the overlapped region. This new polygon consists of multiple overlapped regions, where each overlapped region contains its specific data. The new non-overlapping polygon, called a superblock is then created in step 120. Each superblock contains all of the cumulative data from each overlapping region within that superblock boundary. The formation of superblocks in lieu of overlapping polygons allows the entire mapped area, such as the continental United States, to be viewed and analyzed as a two-dimensional region containing two-dimensional data. The entire spectrum data for all polygons (non-overlapping regions) and superblocks (previously overlapping regions) can now be processed in step 130. The data can be displayed graphically in step 140. The data can also be used to generate reports in step 150.

Figure 2:
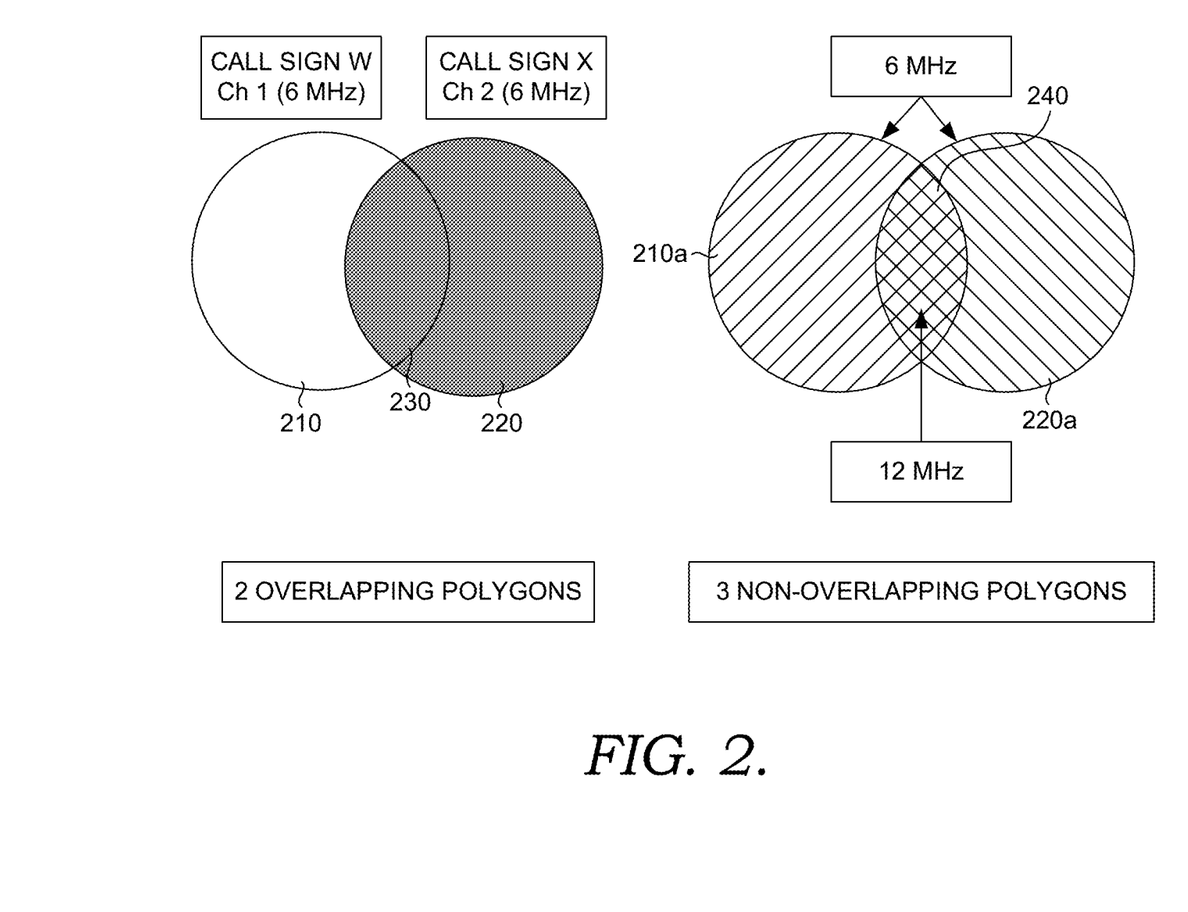
FIG. 2 depicts a superblock in accordance with an embodiment of the invention.

FIG. 2 depicts a superblock that was formed from two overlapping channels. FIG. 2 depicts just one of many possible superblocks that can be formed, all of which are encompassed by an embodiment of the invention. Channel 1 region 210, which is identified by call sign W has a bandwidth of 6 MHz, and channel 2 region 220, which is identified by call sign X also has a bandwidth of 6 MHz. Even though both channel 1 region 210 and channel 2 region 220 have the same bandwidth, this is not a required feature, and many overlapping channels will have different bandwidths. A portion of the geographical region covered by channel 1 is overlapped by a portion of the geographical region covered by channel 2. Since both channel 1 and channel 2 have a bandwidth of 6 MHz each, this results in an overlapped region 230 containing a total of 12 MHz.

Therefore, a non-overlapping superblock 240 containing 12 MHz bandwidth is formed to represent the former overlapped region 230. As a result of forming superblock 240, the entire geographical region covered by channel 1 and channel 2 can now be accurately represented in a two-dimensional view using three non-overlapping polygons. This new two-dimensional view consists of most of the original region covered by channel 1, which is now designated as geographical region 210a, most of the original region covered by channel 2, which is now designated as geographical region 220a, and the region in which channel 1 and channel 2 overlap 230, which is now designated as geographical region or superblock 240. FIG. 2 shows two overlapping regions to explain the formation of a superblock. Embodiments of the invention include any number of overlapping regions, which are converted to single non-overlapping superblocks.

Figure 3:
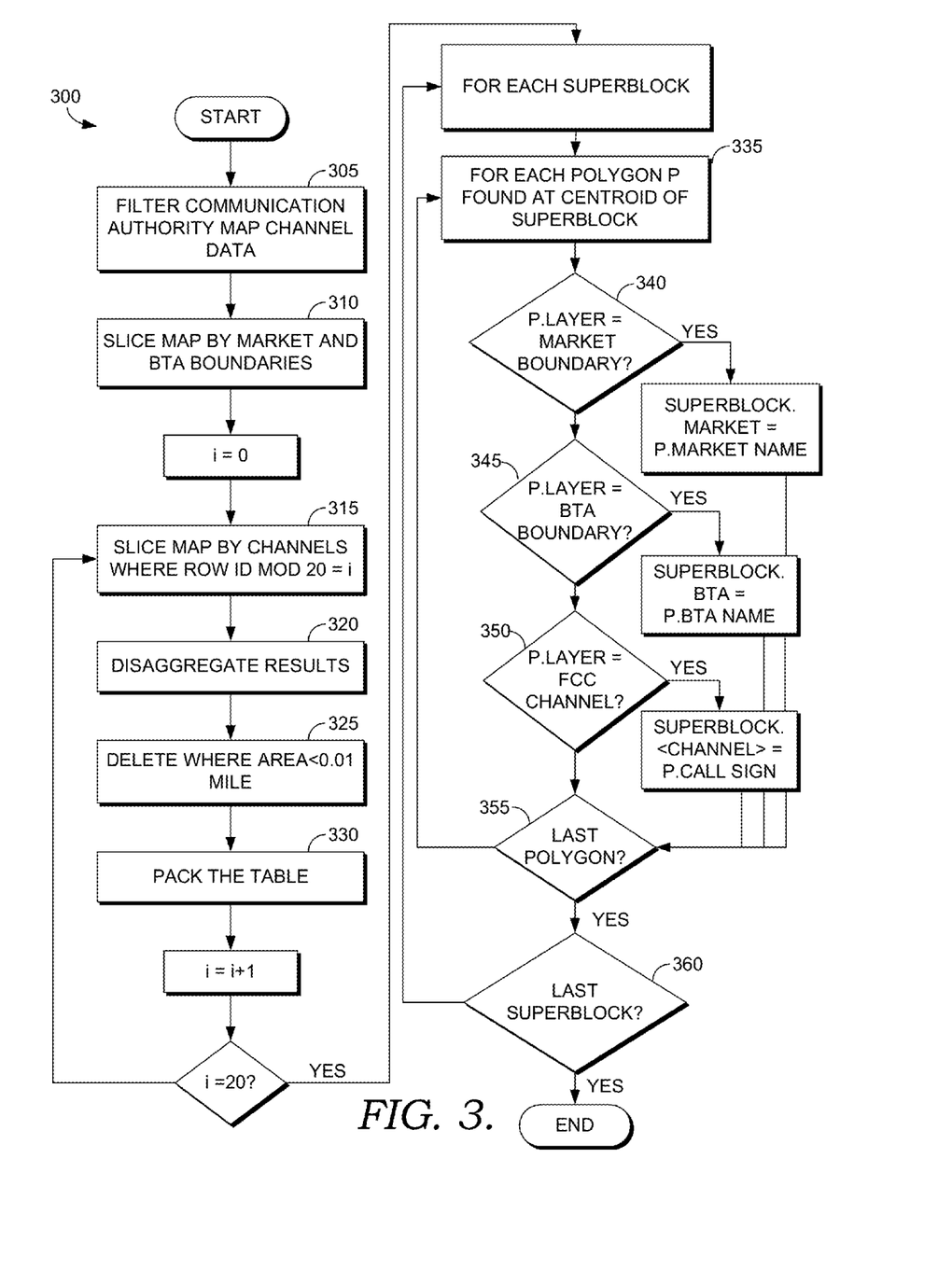
FIG. 3 is a flowchart of a superblock algorithm in accordance with an embodiment of the invention.

FIG. 3 shows the superblock method 300 used to create the non-overlapping polygons, which are also called superblocks. Channel data maps can be obtained from a communications authoritative source or from a commercial source. The channel data maps are then filtered in step 305. Examples of filtering data maps could include removing certain channels that are not of interest, or applying a blanket piece of information pertinent to some of the channels. Boundaries are then drawn for the maps according to market service areas and basic trading areas in step 310. Market service areas are usually determined by the marketing group of a particular company, and are based upon the geographical regions of interest. Market service areas may be primarily centered around the major metropolitan areas. A basic trading area can be based upon county boundaries or a group of aggregate counties, or based upon the boundaries of a particular mapping authority. A market service area may or may not coincide with a basic trading area.

The channel data maps are then divided according to the geographical region covered by each channel in step 315. Step 315 is the beginning of a loop for each channel to be mapped. In the example given, the loop is completed twenty times for twenty different channels. However, any number of loop repetitions could be used, and the number of loop repetitions will be partially dependent upon the computing resources used. Step 320 entails disaggregating the mapped results, such as cleaning up duplicate results. It would usually be desirable to remove areas less than an established minimum area, and this is shown as step 325. The resulting table of results is then packed in step 330 to remove deleted undesirable data. The loop then repeats until all of the designated channels have been evaluated.

The method continues in the form of another loop in order to identify and name each mapped layer or polygon that was previously drawn according to market service areas, basic trading areas, and geographical channel regions. The loop begins by locating the geographic centroid of each polygon in step 335. The method shown determines if the selected layer or polygon is a market service region in step 340. If the selected polygon is a market service region, then it is given a market name. If the selected polygon is not a market service region, then the loop asks if the selected region is a basic trading area in step 345. If the selected polygon is a basic trading area, then it is given a basic trading area name. If the selected polygon is not a basic trading area, then the loop determines if the selected region is a map designated by a channel in step 350. If the selected polygon is a channel map, then the polygon is named for its particular call sign, which is the license identifier for that channel. The loop then determines if this is the last layer in step 355. If this is the last layer, then the counter is incremented by one, and the loop repeats until the total number of loop completions is equal to the designated number of layers to be evaluated, at which point the method ends.

Figure 4:
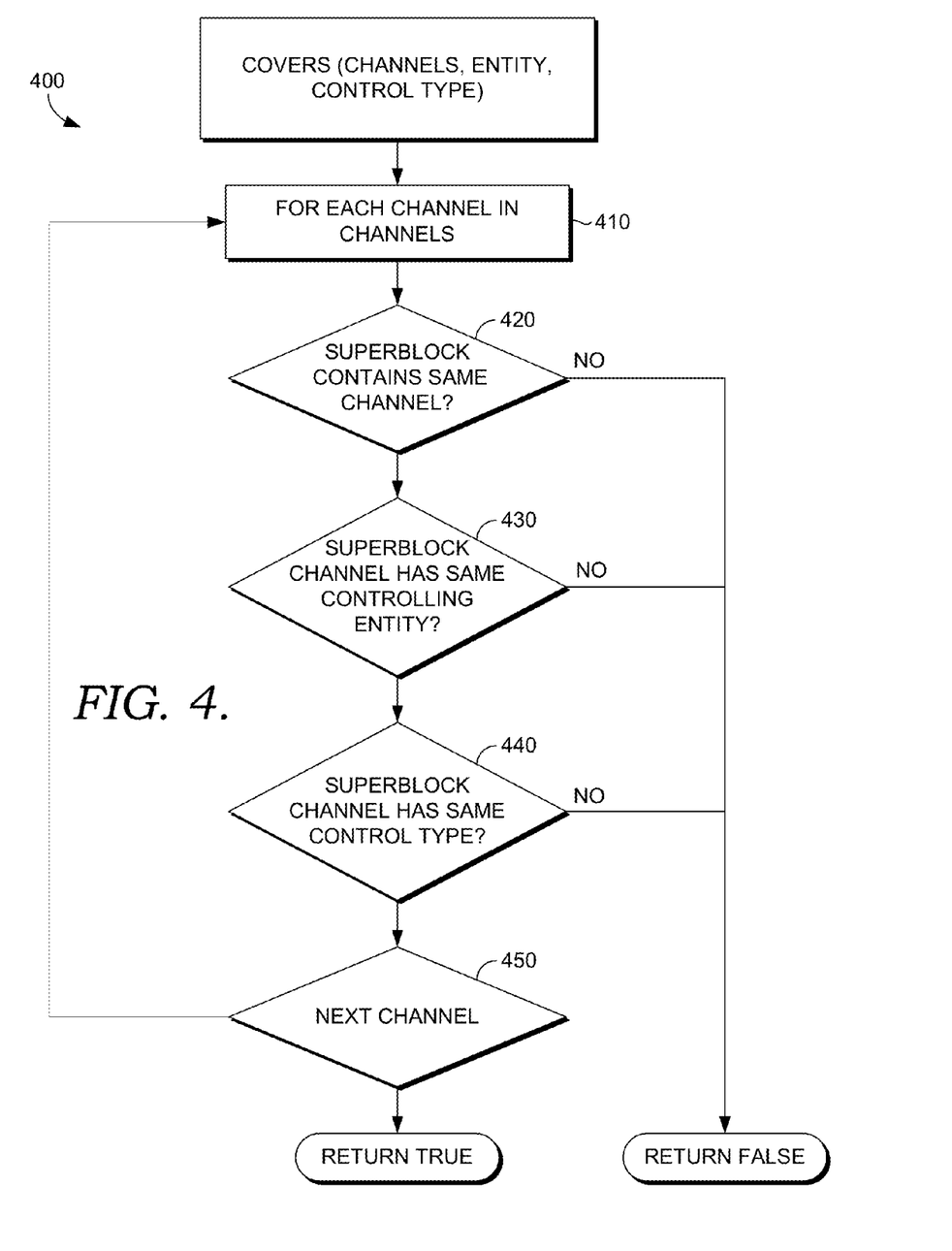
FIG. 4 is a flowchart of a covers algorithm in accordance with an embodiment of the invention.

With all of the data obtained from various sources and with the completion of the superblock method 300, we have specific channel information, such as the name of the channel, the call sign, how many MHz are on that channel, who controls the channel and what type of control, and whether the channel is leased or subleased. In addition, superblock information is known as to the area, the population, and all the channels within each superblock. Another method, called the covers method 400 shown in FIG. 4, can determine if a specific channel(s), controlling entity, and control type are present for each of the channels of a particular superblock. A controlling entity is defined here as the company or individual that owns the particular communications interest or rights, and is either using that interest for themselves or has leased it to another company or individual. A control type is usually either a full flexible use, which means it could be used for any legal use, or a controlled use which is specifically defined within the terms of the sale or lease of the communications interest. Each channel within the superblock is provided in step 410. For each channel in the superblock, the covers method 400 determines if the superblock contains the initially established or desired channel in step 420. If the answer is yes, then the method asks if that superblock channel has the same controlling entity as the desired controlling entity in step 430. If the answer is yes, then the method determines if the superblock channel has the same control type as the desired control type in step 440. If the answer is yes, then the next channel within the superblock is selected in step 450, and the loop repeats. The loop will continue to repeat until all of the channels within that superblock have been evaluated through the loop.

The covers method 400 is used within three other methods; these three methods are used to determine the spectrum depth, the maximum contiguous coverage, and the spectrum depth for a particular population within a superblock. A description of these three methods will be given, with reference to FIG. 5. The spectrum depth method 510 calculates the total bandwidth of a controlling entity for a particular control type within a particular superblock. The channels within a specified superblock are given in step 501. One of the superblock channels is run through the covers method 400, as described above with reference to FIG. 4, and the covers method is designated in the spectrum depth method as step 502. The spectrum depth or bandwidth of the channel is added to any previous recorded spectrum depth in step 503. The loop then selects the next channel within the superblock in step 504. The loop will continue to repeat as long as there are additional channels to evaluate within the superblock.

Figure 5:
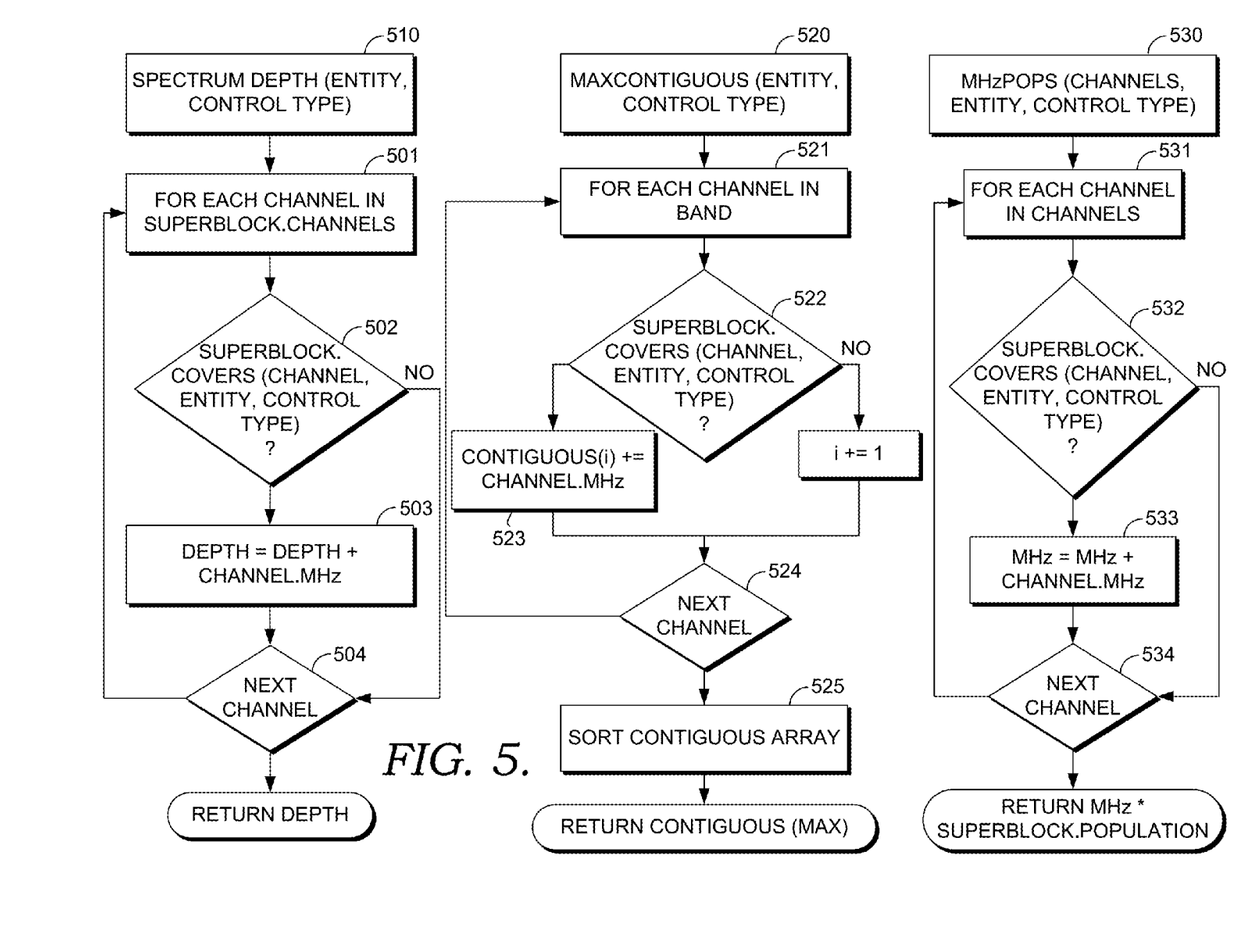
FIG. 5 contains three flowcharts of algorithms used to determine the spectrum depth, the maximum contiguous coverage, and the spectrum depth for a particular population within a superblock in accordance with an embodiment of the invention.

The maximum contiguous coverage method 520, shown in FIG. 5, calculates the contiguous coverage for a specified entity and control type within a particular bandwidth. All of the channels within the specified bandwidth are given in step 521. One of the bandwidth channels is run through the covers method 400, as described above with reference to FIG. 4, and the covers method is designated in the maximum contiguous coverage method as step 522. The bandwidth of the channel is added to any previous recorded bandwidth in step 523. The next channel within the designated bandwidth is then selected in step 524. The loop continues to repeat for each channel within the designated bandwidth. After all of the channels have been evaluated through the loop, then the different contiguous arrays are sorted in step 525.

The spectrum depth population method 530, shown in FIG. 5, is an extension of the spectrum depth method 510. The spectrum depth population method 530 also considers the population of the area, and a specified channel(s). Each of the channels to be considered are given in step 531. One of the channels is run through the covers method 400, as described above with reference to FIG. 4, and the covers method is designated in the spectrum depth population method as step 532. The spectrum depth for the selected channel is added to any previous recorded spectrum depth in step 533. The next channel is then selected in step 534. The loop continues to repeat for each channel designated in step 531.

Spectrum analysis described herein can be used to obtain very specific results that are of interest in a short period of time. As an example of one embodiment, Company A wants to deploy services in a particular area X with a particular contiguous spectrum depth S. Spectrum analysis could define who owns or controls this particular area X, how close Company A now exists in relation to this particular area X and other areas under the same controlling interest C, and if and where Company A spectrum depth S intersects with the controlling interest C of the particular area X.

Another embodiment of the invention performs benchmarking. Benchmarking provides an outer boundary that communications design planners can use to determine the height and placement of towers, so as not to interfere with other towers close by. The spectrum analysis can be used to determine your company's spectrum depth locations, how close other companies are to your company controlled locations, and who those companies or controlling interests are.

Communication authority guidelines and marketing opportunities are just two general areas in which the invention can be implemented. It can also be utilized for asset inventories in order to determine what is controlled and what are the control types, and for spectrum evaluations which could assist in determining future marketing decisions.

Many different arrangements of the various embodiments depicted, as well as embodiments not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and sub-combinations are of utility and may be employed without reference to other features and sub-combinations and are contemplated within the scope of the claims. Not all steps listed in the various figures need be carried out in the specific order described.

The technology claimed is:

1. A computer-implemented method for identifying attributes for channels in a superblock, the computer-implemented method comprising:
   identifying, by a computing system, desired attributes for a channel of a communication network; and
   loading, by the computing system, a superblock associated with a collection of communication channels of the communication network, wherein loading the superblock further comprises:

(1) checking, by the computing system, each channel within the superblock for matches to the desired channel attributes,
(2) generating, by the computing system, a notification for each channel of the superblock that matches one or more desired channel attributes, and
(3) based on the matches to the one or more desired channel attributes, calculating, by the computing system, spectrum depth, wherein the spectrum depth provides the bandwidth available for each controlling entity in the superblock.

2. The method of claim 1, wherein the desired attributes include channel name or frequency, control type, or controlling entity.

3. The method of claim 1, wherein each channel of the superblock specifies a particular controlling entity or a particular control type within each of a plurality of territories.

4. The method of claim 3, wherein the maximum contiguous coverage corresponds to a band of channels within each of said territories.

5. The method of claim 1, wherein the superblock includes channels from metropolitan market service areas and basic trading areas.

6. The method of claim 1, wherein the superblock includes spectrum assets related to a wireless communications industry.

7. The method of claim 6, wherein the spectrum depth provides the bandwidth available for each controlling entity in the superblock.

8. The method of claim 1, further comprising correlating population density and spectrum depth.

9. A non-transitory computer-readable media having computer-usable instructions that perform a method for identifying attributes for channels in a superblock, the computer-implemented method comprising:
identifying, by a computing system, desired attributes for a channel of a communication network; and
loading, by the computing system, a superblock associated with a collection of communication channels of the communication network, wherein loading the superblock further comprises:
(1) checking, by the computing system, each channel within the superblock for matches to the desired channel attributes,
(2) generating, by the computing system, a notification for each channel of the superblock that matches the one or more desired channel attributes, and
(3) based on the matches to the one or more desired channel attributes, calculating, by the computing system, maximum contiguous coverage, wherein the maximum contiguous coverage corresponds to a band of channels within each of said territories.

10. The media of claim 9, wherein the desired attributes include channel name or frequency, control type, or controlling entity.

11. The media of claim 9, wherein each channel of the superblock specifies a particular controlling entity or a particular control type within each of a plurality of territories.

12. The media of claim 9, wherein the superblock includes channels from metropolitan market service areas and basic trading areas.

13. The media of claim 9, further comprising:
calculating spectrum depth of the spectrum assets, wherein the superblock includes spectrum assets related to a wireless communications industry.

14. The media of claim 13, wherein the spectrum depth provides the bandwidth available in the superblock.

15. The media of claim 13, wherein the spectrum depth provides the bandwidth available for each controlling entity in the superblock.

16. The media of claim 14, further comprising correlating population density and spectrum depth.

17. A non-transitory computer-readable media having computer-usable instructions that perform a method for calculating spectrum depth, the computer-implemented method comprising:
loading, by a computing system, a superblock associated with a collection of communication channels of the communication network, wherein loading the superblock further comprises:
identifying, by the computing system, each channel in the superblock;
calculating, by the computing system, a bandwidth for each of the channels in the superblock;
aggregating, by the computing system, the bandwidth for each of the channels to calculate a total bandwidth of the superblock.

18. The media of claim 17, further comprising determining the maximum contiguous coverage for the superblock.

* * * * *